United States Patent
Dottax et al.

(10) Patent No.: US 11,763,292 B2
(45) Date of Patent: Sep. 19, 2023

(54) DYNAMIC SECURITY CODE FOR A CARD TRANSACTION

(71) Applicant: IDEMIA FRANCE, Courbevoie (FR)

(72) Inventors: Emmanuelle Dottax, Courbevoie (FR); Paul Dischamp, Courbevoie (FR); Lionel Grassin, Courbevoie (FR); Elder Dos Santos, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 1180 days.

(21) Appl. No.: 16/322,136

(22) PCT Filed: Jul. 27, 2017

(86) PCT No.: PCT/EP2017/069091
§ 371 (c)(1),
(2) Date: Jan. 31, 2019

(87) PCT Pub. No.: WO2018/024615
PCT Pub. Date: Feb. 8, 2018

(65) Prior Publication Data
US 2021/0295308 A1    Sep. 23, 2021

(30) Foreign Application Priority Data
Aug. 2, 2016 (EP) ..................... 16306003

(51) Int. Cl.
*G06Q 20/34* (2012.01)
*G06Q 20/40* (2012.01)
*G06Q 20/32* (2012.01)

(52) U.S. Cl.
CPC ......... *G06Q 20/341* (2013.01); *G06Q 20/326* (2020.05); *G06Q 20/401* (2013.01)

(58) Field of Classification Search
None
See application file for complete search history.

(56) References Cited

U.S. PATENT DOCUMENTS 8,577,803 B2 * 11/2013 Chatterjee ............ G06Q 20/326
   705/41
9,530,125 B2 * 12/2016 Bacastow .......... G06Q 20/4012
(Continued)

FOREIGN PATENT DOCUMENTS

WO    2007/149830 A2    12/2007
WO    2009/026365 A2    2/2009
WO    WO-2014022778 A1 * 2/2014 ............ G06F 21/34

OTHER PUBLICATIONS

Dubois et al.,Dynamic Security Codes: A Primer,Mar. 23, 2021, Secure Technology Alliance, (https://www.securetechalliance.org/wp-content/uploads/Dynamic-Security-Code-Cards-Webinar-FINAL-Mar-23-2021.pdf) (Year: 2021).*

(Continued)

*Primary Examiner* — Paul S Schwarzenberg
(74) *Attorney, Agent, or Firm* — NIXON & VANDERHYE

(57) ABSTRACT

A card (35) generates a dynamic security code for a card transaction, e.g. a card not present (CNP) transaction. The card (35) receives a request (83) to generate a dynamic security code from an electronic device (10) external to the card via an external card interface (330). The card (35) receives a message (87) comprising a time via the external card interface (330). The card (35) computes (89) the dynamic security code based on the time and a key (dCVV-key) stored at the card. The card (35) sends the dynamic security code (90) to the electronic device (10) via the external card interface (330) for display on a display (14) of the electronic device (10). The card (35) may determine (88) an authenticity of the message comprising the time.

13 Claims, 12 Drawing Sheets

(56) References Cited

U.S. PATENT DOCUMENTS

| | | | |
|---|---|---|---|
| 9,646,303 B2* | 5/2017 | Karpenko | G06Q 20/3227 |
| 9,947,001 B2* | 4/2018 | Smith | G06Q 20/363 |
| 10,116,447 B2* | 10/2018 | Gordon | H04L 63/0861 |
| 10,223,694 B2* | 3/2019 | Makhotin | G06Q 20/3278 |
| 10,572,873 B2* | 2/2020 | Tanner | G06Q 20/3829 |
| 2007/0136211 A1 | 6/2007 | Brown et al. | |
| 2011/0225089 A1* | 9/2011 | Hammad | G07F 7/12 |
| | | | 705/44 |
| 2012/0153028 A1 | 6/2012 | Poznansky et al. | |
| 2014/0279555 A1 | 9/2014 | Guillaud | |
| 2016/0148194 A1* | 5/2016 | Guillaud | G06Q 20/341 |
| | | | 235/492 |
| 2016/0162883 A1 | 6/2016 | Liscia et al. | |

OTHER PUBLICATIONS

International Search Report, dated Feb. 6, 2018, from corresponding PCT/EP2017/069091 application.

* cited by examiner

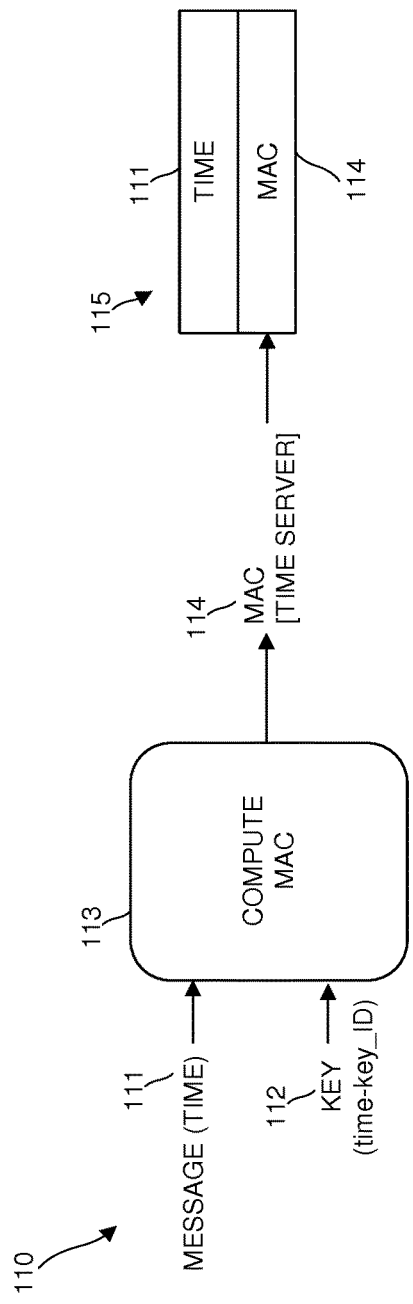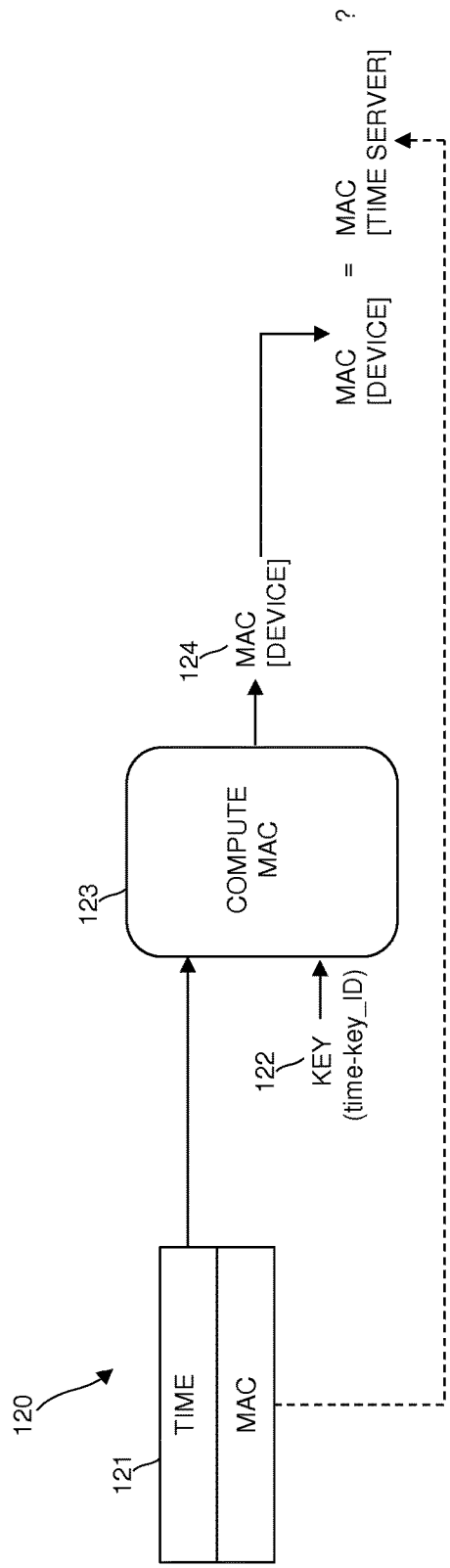

DYNAMIC SECURITY CODE FOR A CARD TRANSACTION

BACKGROUND

Fraudulent use of payment cards, such as credit and debit cards, is an ongoing problem. Card not Present (CNP) transactions pose a particularly high risk. A CNP transaction may be a payment transaction made online, or a payment transaction made by telephone. In a simplest case, a fraudulent party can make a fraudulent transaction by acquiring just the Primary Account Number (PAN) and expiry date of the payment card. Many payment cards now include a Card Verification Value (CVV) to improve security. The CVV is printed on the signature panel of a card, or on the front of the card. However, as the CVV is another static value, it is possible for a fraudulent party to acquire, and use, the CVV in a CNP transaction.

A way of improving security is to dynamically generate the security code. US2014/0279555 A1 describes a card which can dynamically generate a security code. FIG. 1 shows a card of this kind. The card 1 has a magnetic strip 2, a signature panel 3 and a miniature display 4. When a user activates a button 5 on the card, a processor within the card generates a security code and displays the code on the display 4.

While a card with a dynamic code generator and a display can improve security, a disadvantage of this arrangement is an increased cost of the cards.

SUMMARY

An aspect of the invention provides a method of generating a dynamic security code for a card transaction, the method comprising at the card:

receiving a request to generate a dynamic security code from an electronic device external to the card via an external card interface;

receiving a message comprising a time via the external card interface;

computing the dynamic security code based on the time and a key stored at the card;

sending the dynamic security code to the electronic device via the external card interface.

The method may determine an authenticity of the message comprising the time.

Optionally, at least one of: computing the dynamic security code; sending the dynamic security code; are only performed if the message comprising the time is determined to be authentic.

The message comprising the time may comprise a Message Authentication Code, MAC, and determining an authenticity of the message may comprise: computing a Message Authentication Code at the card using a key stored at the card; and comparing the computed Message Authentication Code with the Message Authentication Code in the received message.

The card may store an identifier which identifies a time key stored at the card used to authenticate the message; and the method may comprise: receiving, via the external card interface of the card, a request for the identifier from the electronic device; and sending the identifier to the electronic device via the external card interface.

The method may comprise: receiving a personal identification number, PIN, from the electronic device via the external card interface; determining if the personal identification number is correct; and only computing the dynamic security code if the personal identification number is determined to be correct.

Another aspect provides a method of generating a dynamic security code for a card transaction, the method comprising at an electronic device external to the card:

receiving a user request to generate a dynamic security code;

sending a request to generate a dynamic security code to the card via a device-to-card interface;

sending a time request to a time source external to the electronic device;

receiving a message comprising a time from the time source;

sending the message comprising the time to the card via the device-to-card interface;

receiving the dynamic security code from the card via the device-to-card interface, wherein a value of the dynamic security code is based on the time; and causing the dynamic security code to be displayed on a display of the electronic device.

The card may store an identifier which identifies a key used to authenticate the message comprising the time, and the method may comprise: sending a request for the identifier to the card via the device-to-card interface; and receiving the identifier via the device-to-card interface.

The method may comprise sending the identifier to the time server with the time request.

The method may comprise: causing the display of the electronic device to display a request for a personal identification number, PIN; receiving a PIN entered by a user on a user input device of the electronic device; and sending the PIN to the card via the device-to-card interface.

The electronic device may be usable with a plurality of different cards and the method may comprise: storing a plurality of identifiers which each identify a key used to authenticate the message comprising the time for each of the cards; causing the electronic device to display an invitation for user input to select one of the plurality of cards; receiving user input selecting one of the cards; retrieving the identifier for the selected card; and sending the retrieved identifier to the time source with the time request.

The external card interface and the device-to-card interface may be a near field communication (NFC) interface.

Another aspect provides a card capable of generating a dynamic security code for a transaction comprising:

a secure element with a processor and storage;

an external card interface;

wherein the storage is configured to store a key and wherein the secure element is configured to:

receive a request to generate a dynamic security code from an electronic device external to the card via the external card interface;

receive a message comprising a time via the external card interface;

compute the dynamic security code based on the time and the stored key;

send the dynamic security code to the electronic device via the external card interface.

The secure element may be configured to determine an authenticity of the message comprising the time.

Another aspect provides an electronic device capable of dynamically generating a security code for a card transaction, the electronic device being separate from the card, the electronic device comprising:

a processor;

storage;

a device-to-card interface;
a user input device;
a display;
wherein the electronic device is configured to:
receive a user request to generate a dynamic security code from the user input device;
send a request to generate a dynamic security code to the card via the device-to-card interface;
send a time request to a time source external to the electronic device;
receive a message comprising a time from the time source;
send the message comprising the time to the card via the device-to-card interface;
receive the dynamic security code from the card via the device-to-card interface; and
cause the dynamic security code to be displayed on the display of the electronic device.

The term "dynamic security code" means that the security code is not static, but changes over time.

An advantage of at least one embodiment is that a dynamic security code is generated without the need for a more expensive card with a display and a battery. Instead, the card generates the dynamic security code and an electronic device is used to provide a display and receive user input. The card provides a secure environment for code generation and key storage. The electronic device can be one of: a phone, a tablet, a personal computer, or a similar device.

An advantage of at least one embodiment is that a dynamic security code is generated for a particular time. Optionally, the time server can provide a time to the host device with information allowing the card to check the authenticity of the message, and therefore the time carried by the message. This prevents a fraudulent party acquiring security code values for future times.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 4 shows preparing a time message at a time server;

FIG. 5 shows authentication of a time message at a card;

DETAILED DESCRIPTION

Figure 1:
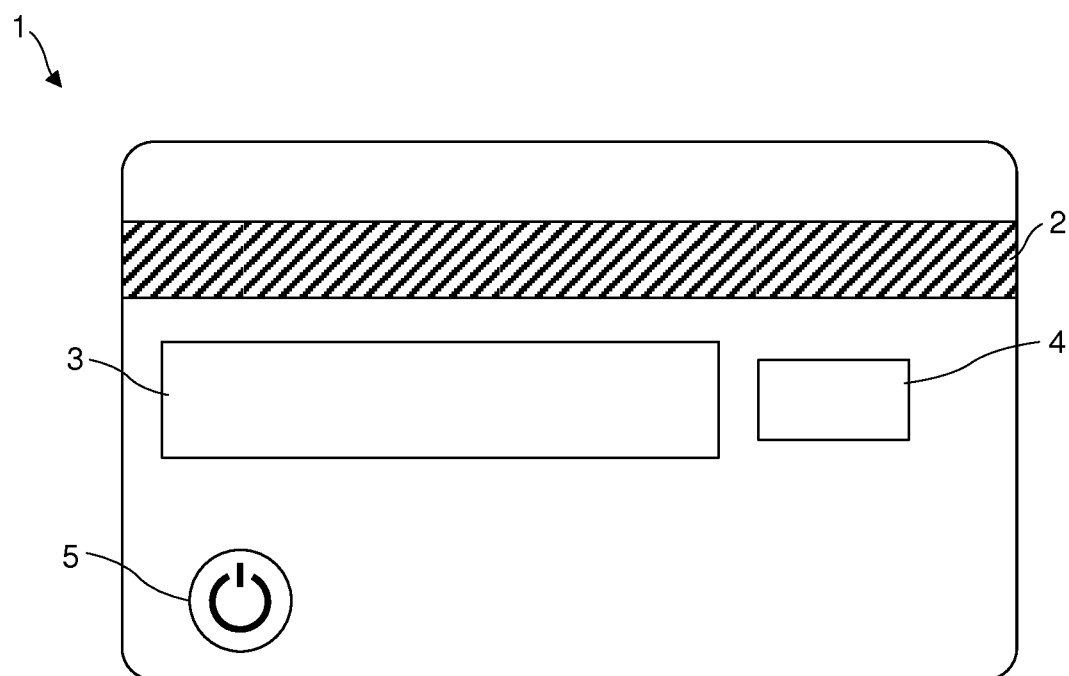
FIG. 1 shows a card which can dynamically generate a security code.
Figure 2:
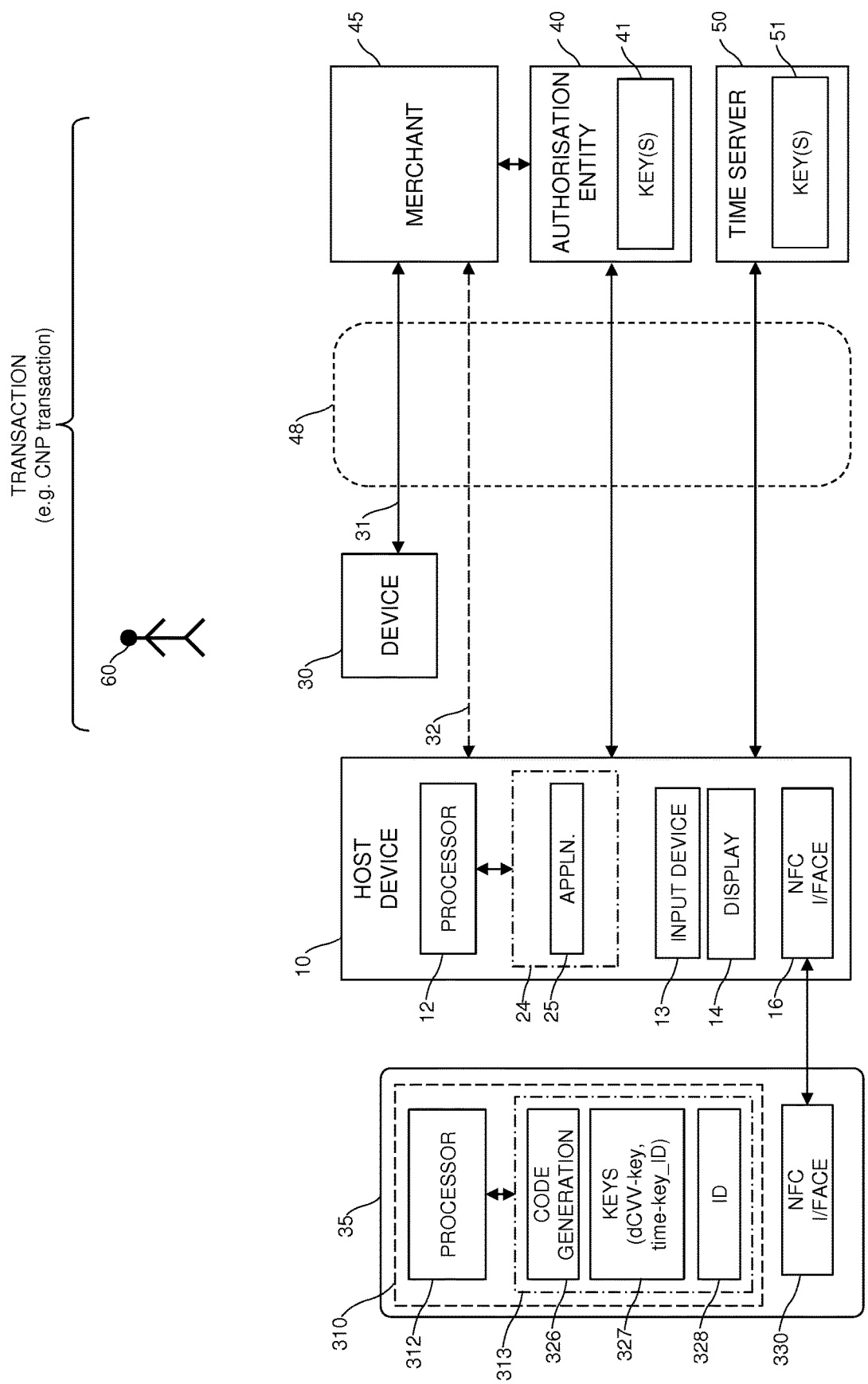
FIG. 2 shows a system for performing transactions, such as CNP transactions.

FIG. 2 shows a system for performing transactions. A transaction uses details of a card 35. The card 35 can be a payment card, such as a debit card or a credit card. The system of FIG. 1 can be used for Card Not Present (CNP) transactions. In a CNP transaction the card itself is not presented to a merchant during the transaction. There is no communication between a card reader/payment terminal at a merchant and the card. Instead, only card details printed on the card (e.g. card number, expiry date, security code) are used in the transaction. An example of a CNP transaction is a telephone transaction between a cardholder and a merchant, with a cardholder speaking to a merchant and vocally providing their card details. Another example of a CNP transaction is an online transaction between a cardholder and a merchant, with a cardholder entering their card details into a payment form during an online session with the merchant, or the merchant's payment processor. The entities shown in the system of FIG. 2 are: a host device 10, a card 35, a merchant 45, an authorisation entity 40, a time server 50 and a user 60. The user 60 is a person (e.g. the cardholder) who wishes to make a transaction using the card 35.

The card 35 comprises a secure element 310. The secure element 310 comprises a processor 312 and storage 313. The secure element 310 provides a secure storage and execution environment. The secure element 310 may be Europay, MasterCard and Visa (EMV) compliant. The secure element 310 has functionality to dynamically generate a security code for a transaction. The card 35 stores code generation software 326 (e.g. an applet) and a key 327 which is used by the code generation software 326. The processor 312 of the secure element 310 can execute the code generation software 326 and the storage 313 within the secure element 310 stores the keys 327. The card 35 may also store an identifier ID 328 which identifies a key (or keys) stored at the card 35. The ID may be sent to a time server 50 to allow the time server to select a key appropriate to the card 35. The card 35 has a Near Field Communication (NFC) interface 330. Another term for an NFC interface is a contactless interface. The card may also have a contact interface. The contactless interface and the contact interface are types of external card interface. Communication to/from the secure element 310 is typically in the form of ISO 7816 Application Protocol Data Units (APDU). The card 35 has information printed on an exterior surface, such as: PAN, expiry date, cardholder name.

The host device 10 is an electronic device which has functionality to display a security code. The host device 10 has a user input device 13 to receive input from a user. As the host device 10 is providing the display and the input device, the card 35 can be a conventional card without a display or input device. The host device 10 has an NFC interface 16 which is capable of communicating with the NFC interface 330 of the card 35. The host device 10 may also store, and execute, an application 25 which communicates with the card 35, outputs information for presentation on the display 14, and receive input from the user input device 13.

The user 60 may use the device 10 to perform a CNP transaction. A user may use device 10 to call, and speak to, a merchant 45, or the user 60 may use browser software on device 10 to perform an online transaction with the merchant 45. This is shown by the communication path 32 between the host device 10 and the merchant 45. In this case, the host device 10 is used to perform the CNP transaction with a merchant 45 and to generate a security code in conjunction with the card 35. Optionally, another device 30 is used for the CNP transaction. This is shown by the communication path 31 between the device 30 and the merchant 45. For example, a user may use device 30 to call, and speak to, a merchant 45, or the user 60 may use browser software on device 30 to perform an online transaction with the merchant 45. In this case, the host device 10 in conjunction with the card 35 are only used to generate a security code and there is no communication path 32 between the host device 10 or card 35 and the merchant 45. The authorisation entity 40 is an entity responsible for approving transactions, such as a card issuer, bank, payment processor or similar entity. A network 48 connects the host device 10 to the merchant 45 and time server 50. A network connects the merchant 45 to the authorisation entity 40.

The card 35 can store two main types of key 327:
(i) a first key (dCVV-key) which is used to generate the security code;
(ii) a second key (time-key_ID) which is used to authenticate a message carrying time information received from the time server 50.

The host device 10 stores an identifier (ID) which can be used by another network entity to select an appropriate key when communicating with the device 10. For example, the time server 50 uses the ID to select an appropriate time-key when sending time messages to the device 10. The card 35 is programmed, before issue (e.g. during personalisation), with a dCVV-key to generate the security code. The authorisation entity 40 will know the dCVV-key which has been programmed into the card 35. Therefore, there is no need enroll the card with the authorisation entity.

Examples of the host device 10 are a smart phone, a tablet, a personal computer (PC) or any other suitable computing device. The host device 10 is capable of performing other tasks. For example, the smart phone can be capable of executing applications to perform a range of other tasks such as messaging, email, office applications. The host device 10 may be a portable device, or a fixed device. The host device 10 comprises an input device 13, such as a keyboard, mouse, touchscreen or other device to receive input from the user. The display 14 of the host device 10 is used to provide information to a user, such as prompts for input, the generated code, status of code generation etc. The host device 10 may provide a graphical user interface (GUI).

The authorisation entity 40 stores one or more keys which are used to locally compute a security code. Entity 40 compares the security code that it has computed with a security code received from a device 10, 30 as part of a CNP transaction. If the security codes match, then the transaction is approved subject to other requirements being met. If the security codes do not match, the transaction is rejected. The merchant/authorisation entity 40 stores data which associates card data (e.g. PAN, expiry date) to a code generation key, dCVV-key.

The time server 50 stores one or more keys which are used when sending time messages to host device 10.

The card 35 generates a security code based on a time. The generated security code has a time-limited period of validity. After that period, the security code is no longer valid and a transaction which attempts to use an expired security code will fail. The time server 50 provides a time. The card 35 uses the time received from the time server 50 to generate the security code. It is advantageous that the time is accurate, to avoid a fraudulent party from computing a security code for a future time. The time server can provide a time to the host device 10. As described more fully below, the host device 10 forwards the time to the card 35 and the card 35 can check the authenticity of a message containing the time and may not generate a security code if the message is not authentic.

Figure 3:
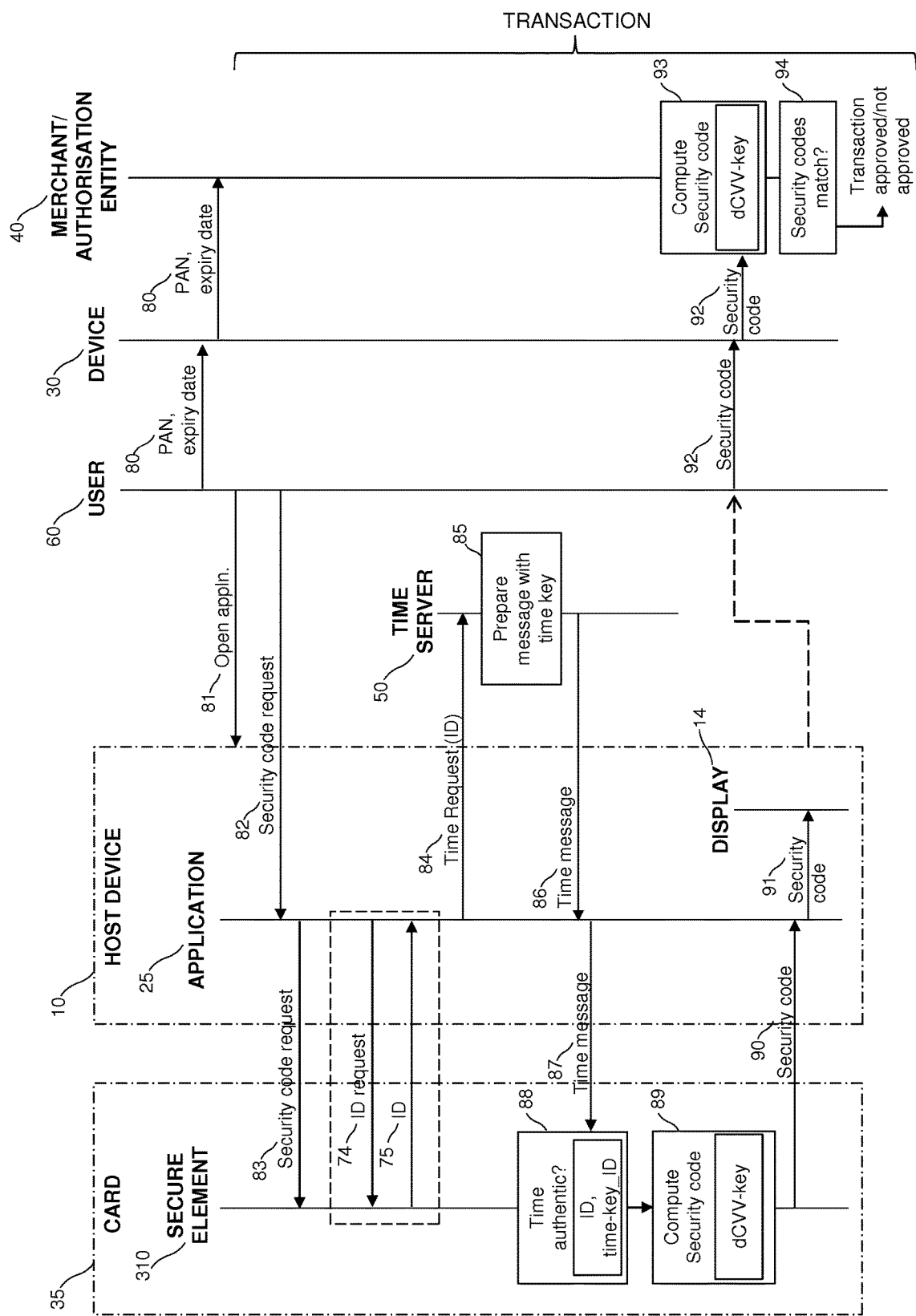
FIG. 3 shows a method of performing a transaction and of dynamically generating a security code in the system of FIG. 2.

FIG. 3 shows an example of performing a CNP transaction using the card 35, the host device 10, the merchant 45, the authorisation entity 40, the time server 50 and the user 60. The use phase also uses the host device 10 to communicate with the merchant 45, or a device 30 to communicate with the merchant 45. The user begins a CNP transaction with a merchant 45. The transaction may be a telephone transaction, or an online transaction with an online merchant or a service provider. The CNP transaction may be transferred to an authorisation entity 40, such as the merchant's payment processor. As part of the CNP transaction, the user is requested to enter card data such as: PAN and expiry date of the card. The user enters this data at 80. The CNP transaction may also request the user to provide other data about the cardholder such as one or more of: cardholder name, cardholder address, post code (ZIP code). The CNP transaction requests the user to enter a security code. The process of obtaining the code is shown in steps 81-91.

Firstly, a user opens 81 the application 25 on the host device 10. The user requests 82 generation of a security code. The user can interact with an application 25 on the host device 10 to request code generation. For example, the user selects an icon displayed on the user interface on display 14 to generate a security code. The user moves ("taps") the host device 10 close to the card 35 for which a code is required. The application 25 sends a code request 83 to the secure element 310 of the card 35 via the NFC interface. The security code is computed for a particular point in time. The application 25 sends a time request 84 to the time server 50. The time request 84 includes an identifier (ID) of the key on the card 35.

There are two possible ways in which the host device can acquire the ID for the card:
(i) the application 25 can request the ID from the card 35 on each occasion that the application 25 communicates with the card 35. The application does not store the ID. FIG. 3 shows an exchange between the application 25 and the card 35. The application 25 sends an ID request 74 to the card 35 and the card 35 sends a reply 75 with the ID.
(ii) the application 25 can perform an enrolment the first time the host device 10 communicates with a card 35.

During enrolment, the application 25 recovers the ID associated with this card 35 and stores the ID at the host device 10. The enrolment process can use a similar exchange 74, 75 shown in FIG. 3. The enrolment need only be performed once. When the application 25 subsequently communicates with the same card 35, the application 25 already knows the ID of that card.

The time server 50 receives the time request 84 and uses the ID to retrieve an appropriate key for the card 35. The time server 50 prepares a message which includes the current time. The message includes information which allows the receiver to authenticate the message. The authentication can be performed in various ways. One suitable method of authenticating the message is to use symmetric keys at the time server 50 and card 35 and a Message Authentication Code (MAC). The time server 50 computes a MAC which uses the message contents and the device-specific key as inputs. The MAC is added to the message sent to the card 35. The MAC can allow the card 35 to determine whether another party has tampered with the contents of the message. The time message 86 is sent to the host device 10. The application 25 receives the time message 86 and forwards it to the secure element 310. The time request 84 and the time message 86 can be communicated over any suitable network, such as: a local area network (LAN) interface; a wide area network (WAN) interface; a wireless interface (e.g. WiFi, 2G, 3G, 4G); a wired interface.

At 88 the secure element 310 determines if the time message is authentic. For example, the secure element 310 can compute a MAC using the same inputs as the time server, i.e. the message contents (minus the received MAC) and the device-specific key. If the MAC computed by the card 35 is the same as the MAC in the received message, the message contents (i.e. the time) is determined to be authentic. At 89, the secure element 310 proceeds to compute the security code. The generated security code is sent 90 to the application 25 and forwarded to the user interface, and displayed on display 14 of the host device 10. The method may only proceed to compute the dynamic security code at 89 if the message containing the time is determined to be authentic. If the message containing the time is determined to not be authentic, the method does not compute the dynamic security code. The card 35 may return an error message to the application 25, for display on the display 14.

Returning to the CNP transaction, the user can now see the security code on the display 14 of host device 10. The user provides the displayed code 92 to the merchant 45 or authorisation entity 40 via device 30. The authorisation entity 40 independently computes the security code. The authorisation entity 40 uses the card data (e.g. the PAN, expiry date) to retrieve a key for the card 35. The authorisation entity 40 then computes the security code using the card-specific key. The security code 92 received from the user is compared 94 with the security code computed at 93. If the security codes match the transaction is approved. If the security codes do not match the transaction is not approved. Other criteria may be used to reach a decision on whether to approve the transaction, such as credit limit, spending patterns, transaction location etc. FIG. 3 shows a combined merchant/authorisation entity. It will be understood that a CNP transaction will typically involve some initial communication between device 10/30 and the merchant 45. The authorisation entity 40 is involved when authorisation is needed. The merchant 45 may contact the authorisation entity 40 (e.g. if the transaction is conducted by a voice call) or the merchant may transfer the transaction to the authorisation entity 40 (e.g. during an online transaction, before or after a user has entered card details).

It will be understood that the steps of the method may be carried out in any suitable order, or simultaneously where appropriate. For example, the security code request 83 and the time message 87 may be sent to the card 35 together, or the security code request 83 may be sent to the card 35 later than shown in FIG. 3.

Time Message Authentication

FIGS. 4 and 5 show an example of authentication of the time message using symmetric keys at the time server 50 and card 35. FIG. 4 shows functionality at the time server 50. A MAC-computing function 113 receives the message contents to be sent 111 (including time) and the device-specific key (time-key_ID) 112 as inputs. The MAC is computed by function 113 and output 114. The computed MAC 114 is added to the message 115 sent to the device 10, and forwarded to the card 35.

FIG. 5 shows functionality at the card 35. A MAC-computing function 123, similar to the one 113 at the time server 50, receives the message from the time server 50 and the device-specific key 112 as inputs. The MAC is computed by function 123 and output 124. The card then determines if the MAC computed by the card is equal to the MAC computed by the time server, i.e. does MAC (device)=MAC (time server). If the MAC computed by the card is the same as the cryptogram in the received message, the message contents (i.e. the time) is determined to be authentic. The time server and card can use a pair of symmetric keys 112, 122 having the same value. The MAC can be computed over all, or a part, of the message. The method may use a hashing function to compute a hash, and the MAC-computing function 113 may be computed on the hash. An example of a suitable hash function is Hash-based Message Authentication Code (HMAC). Examples of suitable block cipher based functions are cipher block chaining message authentication code (CBC-MAC) and Cipher-based Message Authentication Code (CMAC). An example of an authenticated time service is the service provided by The National Institute of Standards and Technology (NIST).

Another way of authenticating the time messages is by using an asymmetric key pair (private key, public key) and a digital signature. The time server 50 has a private key and a public key. The time server performs a hash of the message and computes a digital signature using the time server's private key. The card 35 decodes the digital signature using a public key of the time server 50 and checks if the decoded signature matches a hash of the message data. If there is a match, the message is determined to be authentic. This method requires the host device 10 to store the time server's public key. There are several possible ways of providing the time server's public key to the host device 10:

- the time server's public key is stored in advance, e.g. at personalisation of the card 35.
- the time server's public key is received at a later time, during an "activation" phase. The card 35 already stores a public key of a certification authority (CA). The time server's public key is received as part of a certificate. The card 35 checks the validity of the certificate containing the time server's public key, using the public key of the CA, before storing the time server's public key.
- the time server's public key is never stored. The time server's public key is received (e.g. as a certificate) with the time message. The certificate is verified, as explained above. This allows more flexibility in the choice of the time server 50.

Figure 6:
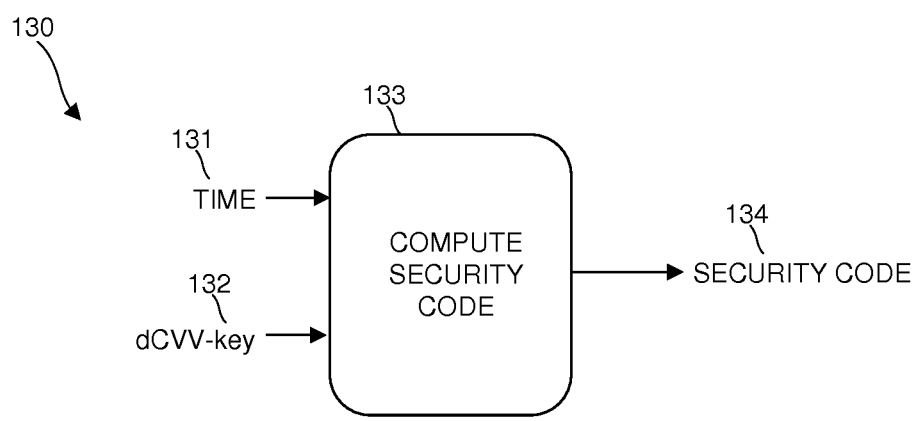
FIG. 6 shows computation of a security code at a host device.

FIG. 6 schematically shows functionality at the secure element 310 of the card 35 to compute the security code. A function 133 receives the time 131 (as received from the time server 50) and the card-specific key (dCVV-key) 132 as inputs. The function 113 computes the security code and outputs the security code 134.

Key Storage and Computation

Figure 7A:
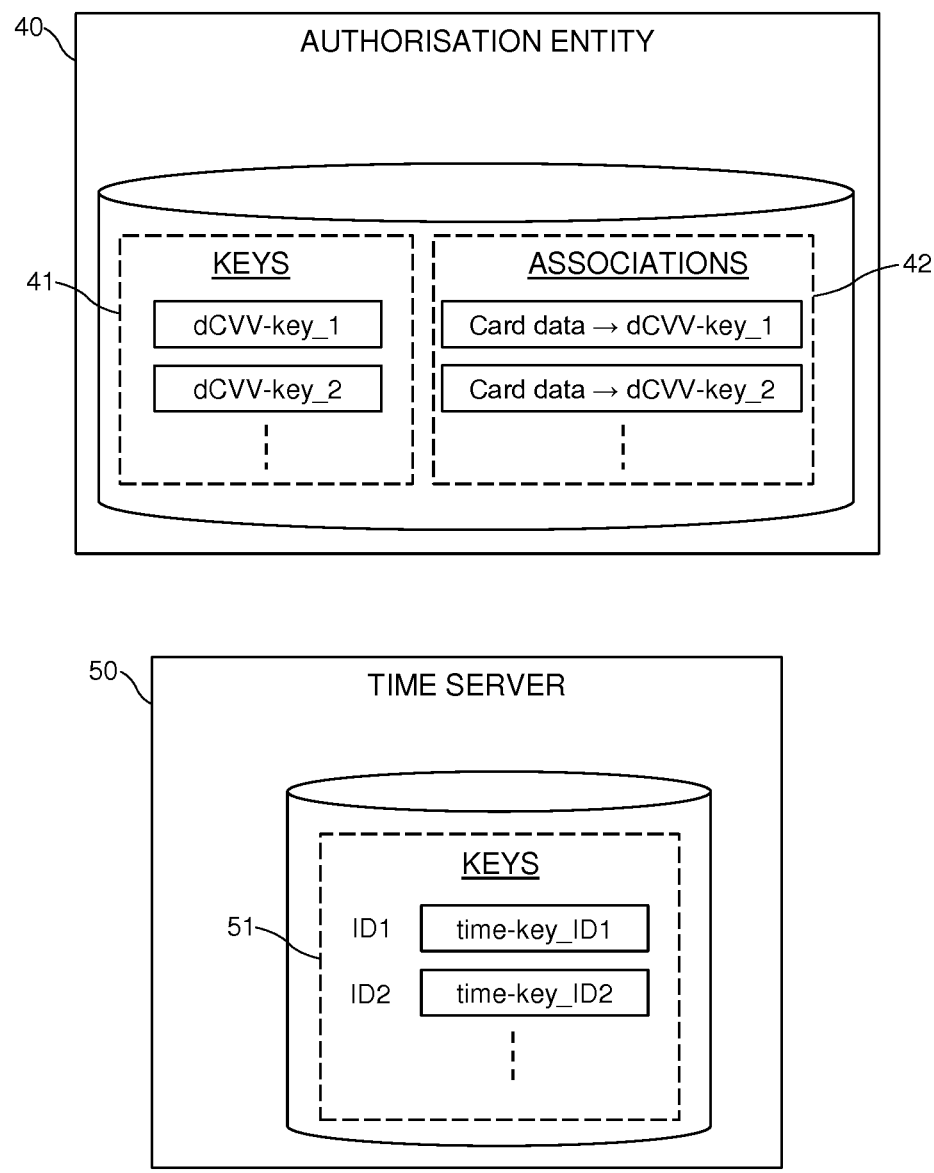
FIG. 7A shows an example of data stored at an authorisation entity and a time server.
Figure 7B:
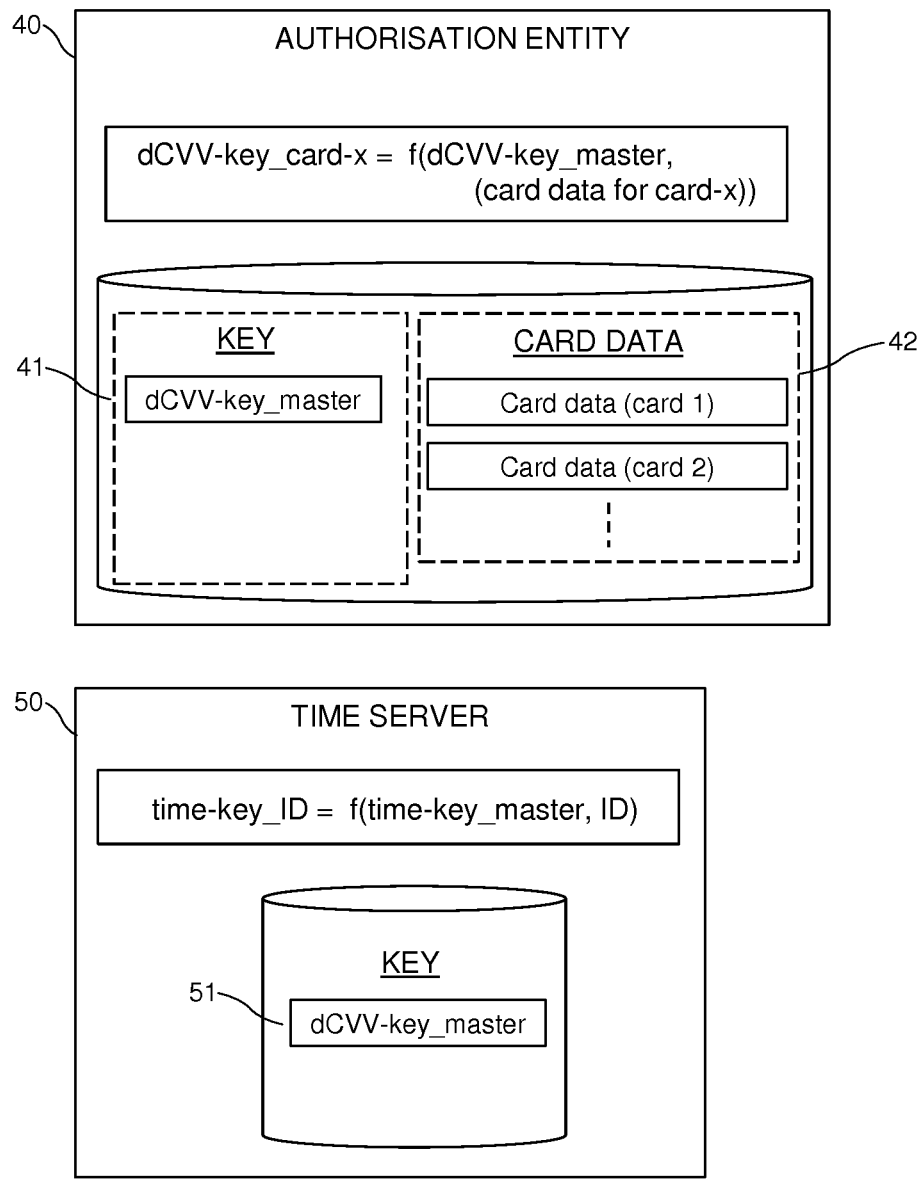
FIG. 7B shows an example of functionality and data stored at an authorisation entity and a time server.

FIGS. 7A and 7B show some examples of the authorisation entity 40 and time server 50. In FIG. 7A the authorisation entity 40 stores keys 41 for the cards it is required to communicate with. The authorisation entity 40 stores associations 42 between card data and card-specific keys. The associations can be formed using data obtained when a card is personalised. The card data can be used as an index to look-up a respective key 51.

FIG. 7B shows another example of the authorisation entity 40 and time server 50. In FIG. 7B the authorisation entity 40 stores a master key (dCVV-key_master) and derives a per-device dCVV-key (dCVV-key_card-x):

$$dCVV\text{-}key\_card\text{-}x = f(dCVV\text{-}key\_master, (card\ data\ for\ card\text{-}x))$$

where f(dCVV-key_master, (card data for card-x)) is a cryptographic function with dCVV-key_master and (card data for card-x) as inputs.

The time server 50 stores a master key (time-key_master) and derives a per-device time-key (time-key_ID):

$$time\text{-}key\_ID = f(time\text{-}key\_master, ID)$$

where f(time-key_master, ID) is a cryptographic function with time-key_master and ID as inputs. The identifier ID is used to derive a respective key. For example, time-key_ID1 is derived by a function with time-key_master and ID1 as inputs, time-key_ID2 is derived by a function with time-key_master and ID2 as inputs and so on.

FIGS. 7A and 7B show examples of the time server 50 where symmetric keys are used, and the time server 50 retrieves a key for a particular card. If time messages are authenticated using an asymmetric key pair (private key, public key) then the time server 50 stores a private key, and optionally stores a public key which is sent to the card 35.

PIN Entry

Figure 8:
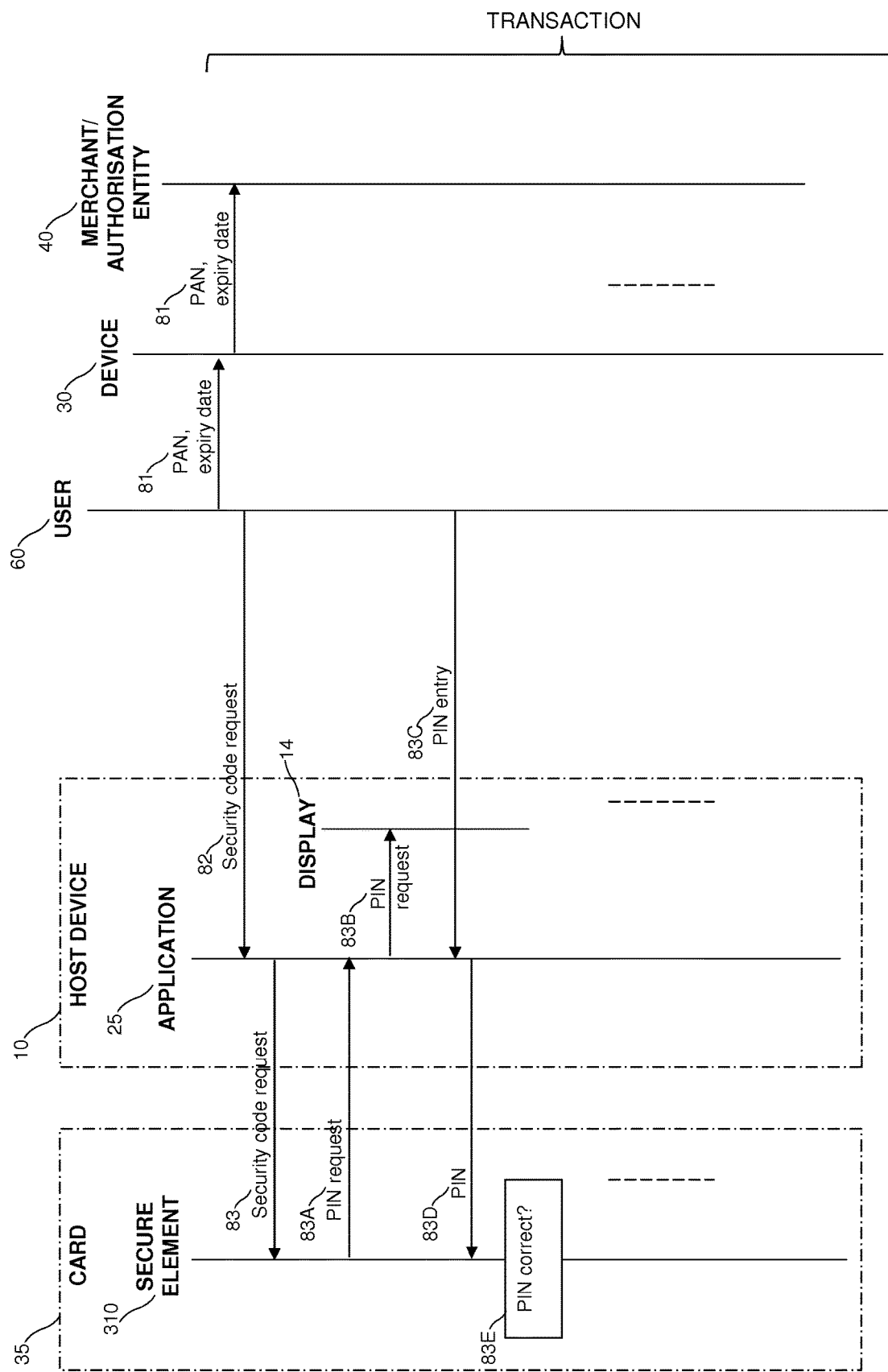
FIG. 8 shows a modified method of performing a transaction with PIN entry.

FIG. 8 shows another example of performing a CNP transaction. The example is similar to FIG. 3, but with an added feature of Personal Identification Number (PIN) entry. The initial steps 81-83 are the same as shown in FIG. 3. When the secure element 310 receives the security code request 83 it responds by sending a PIN request 83A to the application 25. The application 25 causes 83B a PIN request message to be displayed on the display 14 of the host device 10. The user enters a PIN at 83C. The application 25 forwards the PIN 83D to the secure element 310. At 83E the secure element checks if the entered PIN is correct. If the entered PIN is incorrect, the secure element 310 may issue another PIN request. Steps 83A-83E are repeated. After a predetermined number of incorrect PIN entry attempts the secure element 310 may reject further attempts. If the entered PIN is correct, the secure element 310 proceeds as shown in FIG. 3. The application 25 may send a time request 84 to the time server 50 after the PIN entry process (83A-83E), before the start 83A of the PIN entry process, or during the PIN entry process (83A-83E).

Multiple Cards

A user may wish to use the host device 10 in conjunction with a plurality of cards. For example, the user may have a debit card and several credit cards. There are several ways of working.

In a first option, the host device 10 and the application 25 may operate in conjunction with any card presented to the host device 10. The application 25 does not store any card details. During the method shown in FIG. 3, the application obtains the ID of the card (74, 75).

Figure 9:
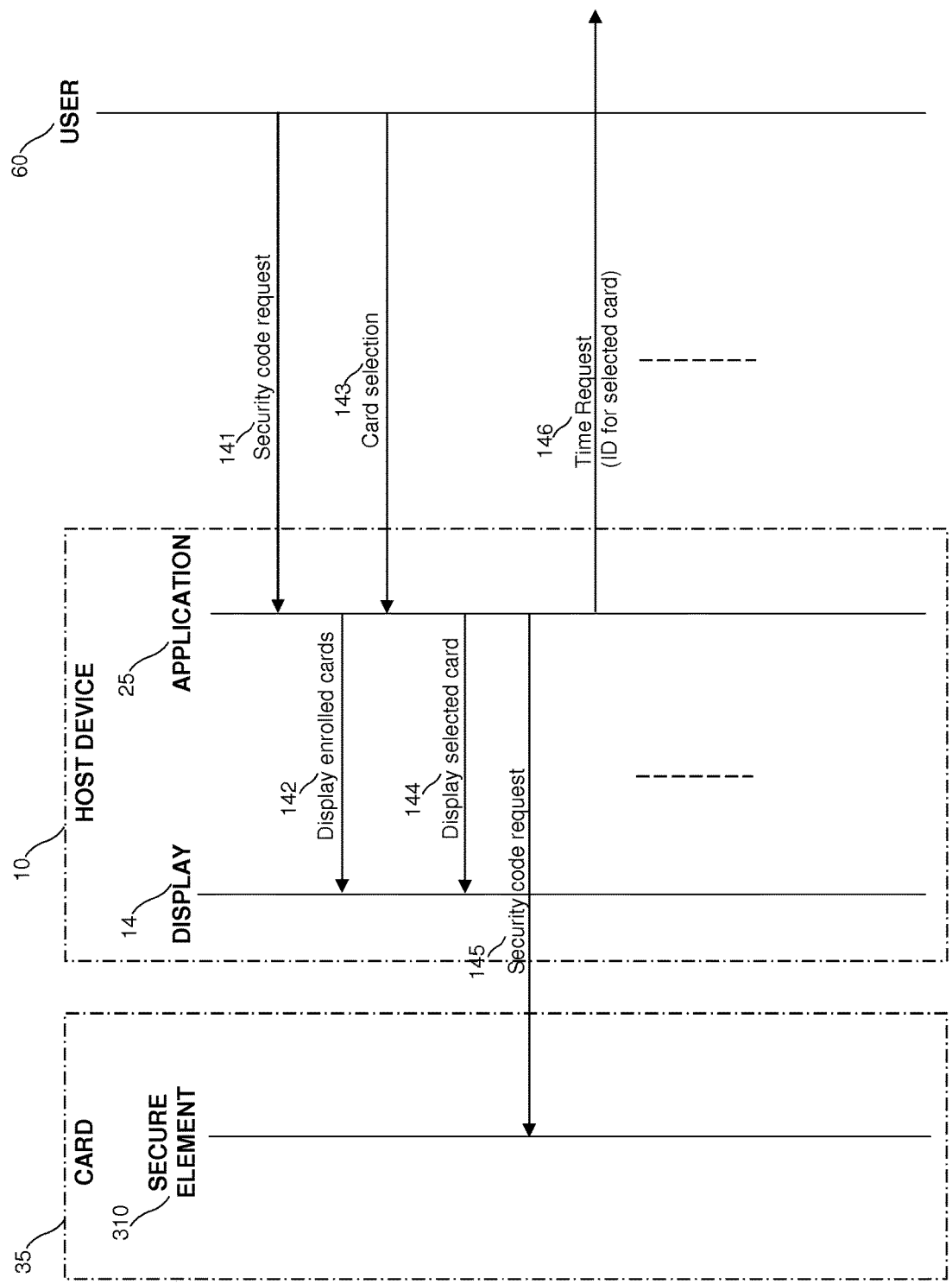
FIG. 9 shows selection of a card at the host device.

In a second option, the host device 10 and the application 25 can store some details about the user's cards. For example, the application can store an ID of each of the user's cards. Each card may be stored with some identifier of the card, such as the last four digits of the PAN, a short name (e.g. Debit card 1) or some other information which is sufficient to remind the user which card it relates to. An initial part of the method of FIG. 3 may be modified as shown in FIG. 9. A user opens the application 25. At 141, the user requests generation of a security code. The application 25 causes 142 the user interface to display information about the plurality of enrolled cards. At 143, a user selects one of the displayed cards. The application 25 causes 144 the user interface to display the selected card. The application 25 sends a security code request 145 to the card. The application 25 sends a time request 146 to the time server with the identifier (ID) for the card selected at 142. The method continues in a similar manner as shown in FIG. 3. This method stores the card IDs.

User Interface

Figure 10:
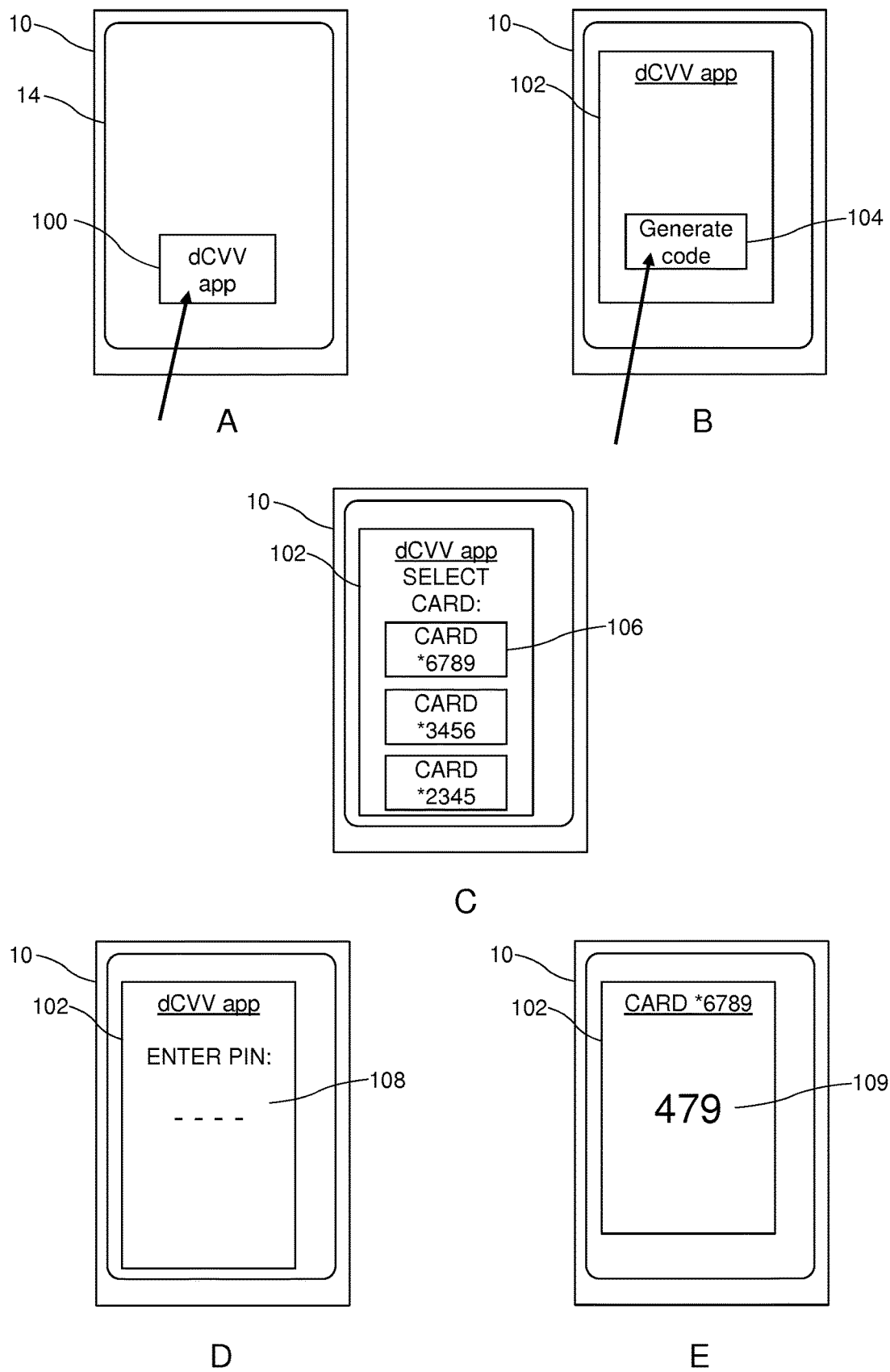
FIG. 10 shows an example sequence of drawings of the user interface on the host device.

FIG. 10 shows an example sequence of drawings A-D of the user interface on the host device 10. In drawing A, the user interface displays an icon 100 for the security code generating application (dCVV). When a user selects icon 100, the security code generating application begins, and the user interface changes to the one shown in drawing B. A window 102 displays an option for the application to generate a security code 104. When selected, the user interface changes to the one shown in drawing C. The window 102 displays an icon 106 for each of the enrolled cards. In this example, it is assumed the user selects the option to generate a security code for the card with a PAN ending *6789. The window 102 changes to drawing D and displays a message 108 to enter a PIN. The host device 10 performs the method shown in FIG. 3 (83-90) and the user interface changes to the one shown in drawing E. The window 102 displays the security code 109 received from the card. In this example, the security code is the three digit number "479". The user interface may display the security code for a time-limited period, e.g. 30 seconds.

In other examples, the sequence of user interface actions may be extended or truncated. For example, if PIN entry is not supported drawing D may be omitted.

Host Device

Figure 11:
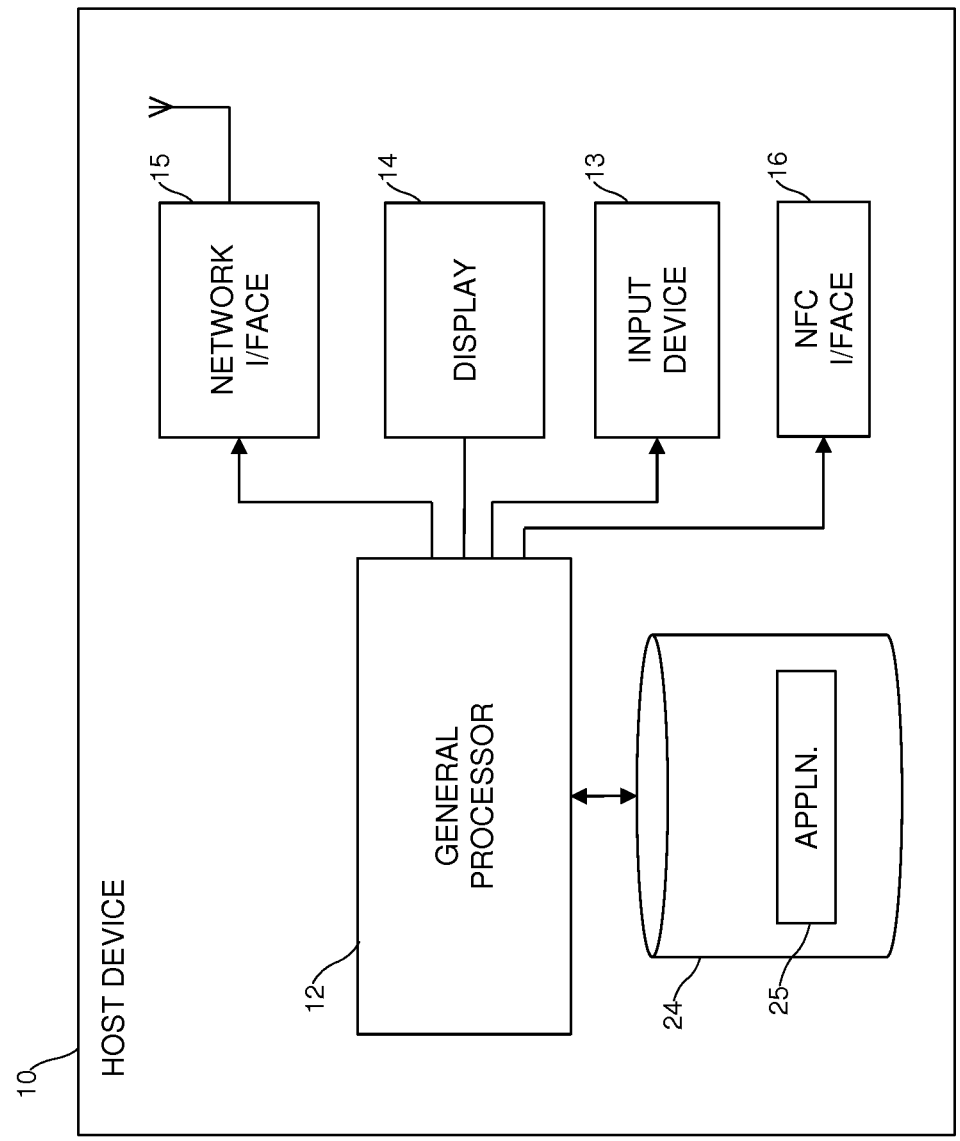
FIG. 11 schematically shows a possible implementation of a host device.

FIG. 11 schematically shows an implementation of the host device 10. Processor 12 may comprise one or more processors which may be microprocessors, microcontrollers or any other suitable type of processors for executing instructions. The processor may be called an Application Processor (AP). The processor 12 is connected to other components of the device via one or more buses. Processor-executable instructions may be provided using any computer-readable media, such as storage 24. The processor-executable instructions can comprise instructions for implementing the application 25 described above. The storage 24 may be of any suitable type such as non-volatile memory (e.g. Flash, Electrically Erasable Programmable Read Only Memory (EEPROM)), read-only memory (ROM), random access memory (RAM), a storage device of any type such as a magnetic or optical storage device. The device 10 comprises one or more network interfaces 15. The network interface may be one or more of: a local area network (LAN) interface; a wide area network (WAN) interface; a wireless interface (e.g. WiFi, 2G, 3G, 4G); a wired interface; or any other suitable network interface. The network interface 15 can be used to send the time request (84, FIG. 3) and receive the time message (86, FIG. 3). The device 10 comprises an input device 13 such as one or more buttons, a keyboard, a pointing device, a touch screen. The device 10 comprises a display 14. The device 10 comprises an NFC interface 16.

Figure 12:
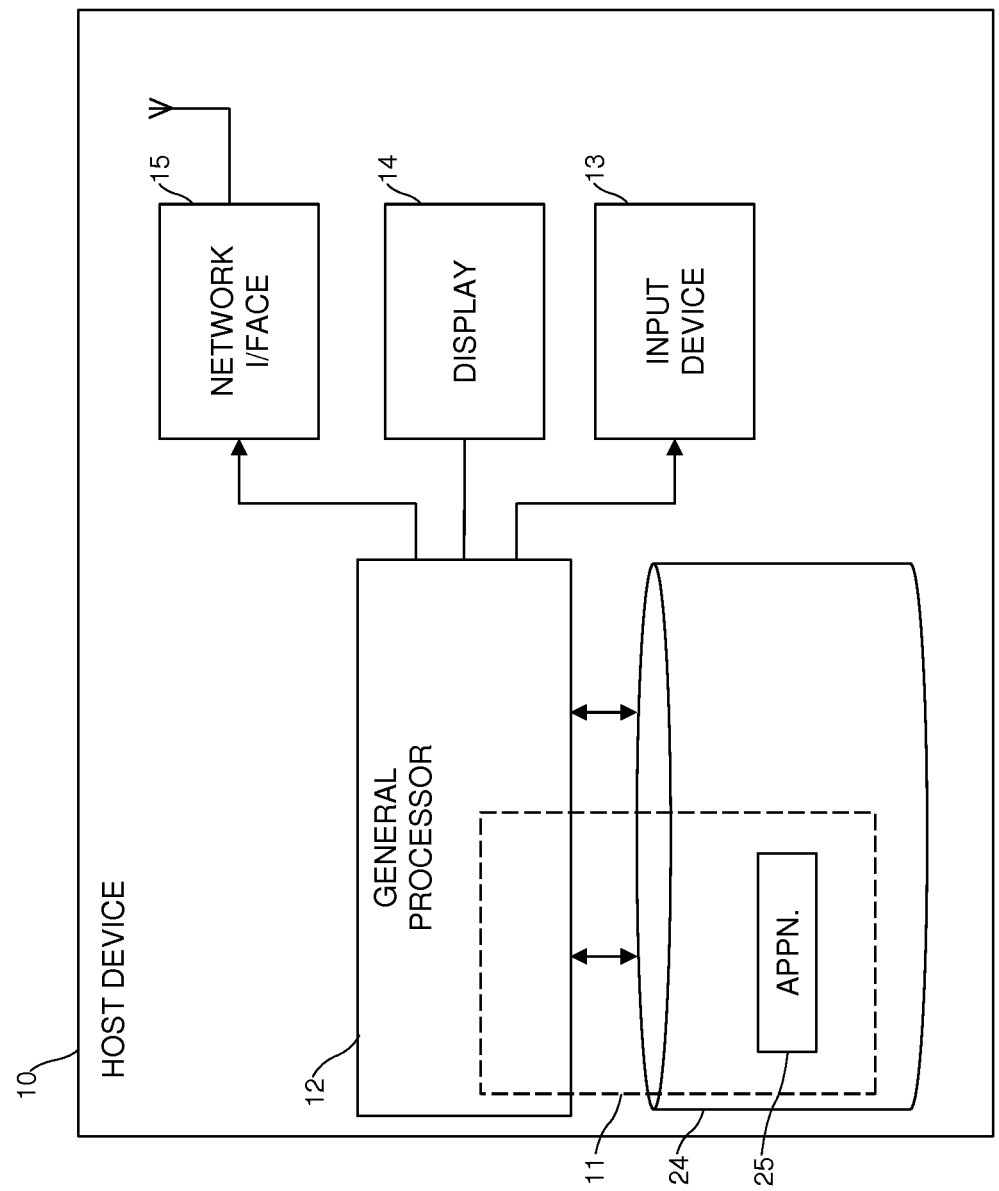
FIG. 12 schematically shows another possible implementation of a host device.

In FIG. 12, the processing environment of the general processor 12 is partitioned to provide a secure partition 11. The secure partition 11 can be used to execute the application 25, or functionality which may be sensitive to malware, such as PIN entry. The partitioning can be done in different ways, such as: a specific hardware IP block integrated to the System on Chip (SoC); a trusted execution environment (TEE), implemented by an hypervisor or a TEE as defined by Global Platform.

Figure 13:
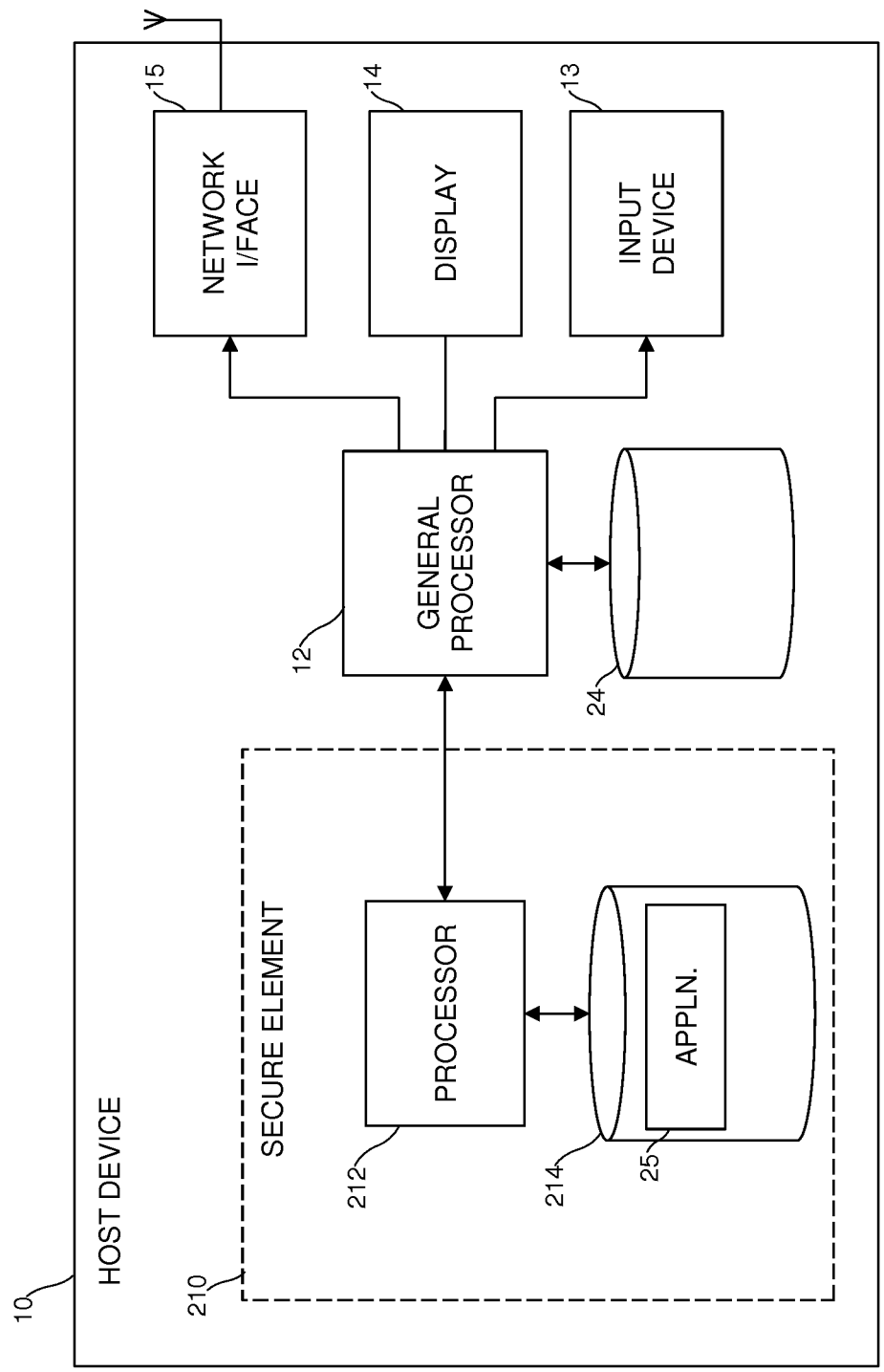
FIG. 13 schematically shows another possible implementation of a host device.

In FIG. 13, the host device 10 has a secure element (SE) 210. The SE may be an embedded SE. An embedded SE may be a separate hardware element on a circuit board of the host device. Other possible forms of secure element are: a SE in a SIM card-Universal Integrated Circuit Card (UICC); a SE in an embedded SIM-eUICC; a SE in an integrated SIM-iUICC; a SE in a separate card, such as a Secure Digital (SD) card.

In any of the examples described above one or more of the keys may be installed during a personalisation stage of the secure element 310.

The steps of the methods described herein may be carried out in any suitable order, or simultaneously where appropriate.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, carried out at a card, of generating a dynamic security code for a card transaction, the card storing an identifier (ID) that identifies a time key (time-key ID) stored at the card for authenticating a message comprising a time, the method comprising:
    receiving a request to generate a dynamic security code from an electronic device external to the card via an external card interface of the card;
    receiving, from the electronic device and via the external card interface, a request for the identifier (ID);
    sending the identifier (ID) to the electronic device via the external card interface;
    receiving the message comprising the time via the external card interface;
    determining an authenticity of the message comprising the time;
    computing the dynamic security code based on the time and the key (time-key ID) stored at the card; and
    sending the dynamic security code to the electronic device via the external card interface.

2. The method according to claim 1, wherein at least one of:
    i) computing the dynamic security code, and
    ii) sending the dynamic security code,
are performed only on condition that the message comprising the time is determined to be authentic.

3. The method according to claim 1,
wherein the message comprising the time comprises a Message Authentication Code (MAC), and
wherein determining an authenticity of the message comprises:
    computing a Message Authentication Code at the card using a key (time-key ID) stored at the card; and
    comparing the computed Message Authentication Code with the Message Authentication Code in the received message.

4. The method according to claim 1, further comprising:
    receiving a personal identification number (PIN) from the electronic device via the external card interface;
    determining if the personal identification number is correct; and
    computing the dynamic security code, only on condition that the personal identification number is determined to be correct.

5. A method, carried out at an electronic device, of generating a dynamic security code for a card transaction, a card of the card transaction storing an identifier (ID) that identifies a key for authenticating a message comprising a time, the method comprising:
    receiving a user request to generate a dynamic security code;
    sending a request, to the card via a device-to-card interface, to generate a dynamic security code;
    sending a request for the identifier (ID) to the card via the device-to-card interface;
    receiving the identifier (ID) via the device-to-card interface;
    sending a time request to a time source external to the electronic device;
    receiving the message comprising the time from the time source;
    sending the message comprising the time to the card via the device to card interface;
    receiving the dynamic security code from the card via the device to card interface, wherein a value of the dynamic security code is based on the time; and
    causing the dynamic security code to be displayed on a display of the electronic device.

6. The method according to claim 5, further comprising:
sending the identifier (ID) to the time source with the time request.

7. The method according to claim 5, further comprising:
causing (83B) the display of the electronic device to display a request for a personal identification number (PIN);
receiving a PIN entered by a user on a user input device of the electronic device; and
sending the PIN to the card via the device-to-card interface.

8. The method according to claim 5, wherein the electronic device is usable with a plurality of different cards, and the method further comprises:
    storing a plurality of identifiers (ID) which each identify a key used to authenticate the message comprising the time for each of the cards;
    causing the electronic device to display an invitation for user input to select one of the plurality of cards;
    receiving user input selecting one of the cards;
    retrieving the identifier (ID) for the selected card; and
    sending the retrieved identifier (ID) to the time source with the time request.

9. The method according to claim 1, wherein at least one of the external card interface and the device to card interface is a near field communication (NFC) interface.

10. A card capable of generating a dynamic security code for a transaction, comprising:
   a secure element with a processor and storage; and
   an external card interface,
   wherein the storage is configured to store a key (dCVV-key), an identifier (ID), and a time key (time-key ID), the identifier (ID) identifying the time key used to authenticate a message comprising a time, and
   wherein the secure element is configured to:
      receive a request to generate a dynamic security code from an electronic device external to the card via the external card interface;
      receive, via the external card interface of the card, a request for the identifier (ID) from the electronic device;
      send the identifier (ID) to the electronic device via the external card interface;
      receive the message comprising the time via the external card interface;
      determine an authenticity of the message comprising the time;
      compute the dynamic security code based on the time and the stored key; and
      send the dynamic security code to the electronic device via the external card interface.

11. An electronic device that dynamically generates a security code for a card transaction, the card storing an identifier (ID) that identifies a key for authenticating a message comprising a time, the electronic device being separate from the card, the electronic device comprising:
   a processor;
   storage;
   a device-to-card interface;
   a user input device; and
   a display,
   wherein the electronic device is configured to:
      receive a user request to generate a dynamic security code from the user input device;
      send a request to generate a dynamic security code to the card via the device-to-card interface;
      send a request for the identifier (ID) to the card via the device-to-card interface;
      receive the identifier (ID) via the device-to-card interface;
      send a time request to a time source external to the electronic device;
      receive the message comprising the time from the time source;
      send the message comprising the time to the card via the device to card interface;
      receive the dynamic security code from the card via the device to card interface; and
      cause the dynamic security code to be displayed on the display of the electronic device.

12. The method according to claim 2,
   wherein the message comprising the time comprises a Message Authentication Code (MAC), and
   wherein determining an authenticity of the message comprises:
      computing a Message Authentication Code at the card using a key (time-key ID) stored at the card; and
      comparing the computed Message Authentication Code with the Message Authentication Code in the received message.

13. The method according to claim 2, further comprising:
   receiving a personal identification number (PIN) from the electronic device via the external card interface;
   determining if the personal identification number is correct; and
   computing the dynamic security code, only on condition that the personal identification number is determined to be correct.

* * * * *